United States Patent
Liu

(10) Patent No.: US 6,632,103 B1
(45) Date of Patent: Oct. 14, 2003

(54) ADAPTIVE BOOSTER CABLE FOR A VEHICLE BATTERY

(75) Inventor: Steve Liu, 5F-3, No. 81, Ho Ping St., Chu Nan Chen, Miau Lih Hsien (TW)

(73) Assignees: James Liu, Taipei Hsien (TW); Steve Liu, Miau Lih Hsien (TW)

( * ) Notice: Subject to any disclaimer, the term of this patent is extended or adjusted under 35 U.S.C. 154(b) by 0 days.

(21) Appl. No.: 10/237,958

(22) Filed: Sep. 10, 2002

(51) Int. Cl.[7] .............................. H01R 11/00; H02J 7/00; H02J 7/04
(52) U.S. Cl. ..................... 439/504; 439/754; 320/105; 320/165
(58) Field of Search .................. 439/754, 759, 439/504; 320/104, 105, 165

(56) References Cited

U.S. PATENT DOCUMENTS

| | | | | |
|---|---|---|---|---|
| 4,163,134 A | * | 7/1979 | Budrose | 200/505 |
| 4,740,740 A | * | 4/1988 | Taranto et al. | 320/105 |
| 4,923,415 A | * | 5/1990 | Lee | 439/755 |
| 4,975,089 A | * | 12/1990 | Lee | 439/755 |
| 5,103,155 A | * | 4/1992 | Joannou | 320/105 |
| 5,167,529 A | * | 12/1992 | Verge | 439/504 |
| 5,189,359 A | * | 2/1993 | Kronberg | 320/103 |
| 5,371,455 A | * | 12/1994 | Chen | 320/165 |
| 5,993,250 A | * | 11/1999 | Hayman | 439/504 |
| 6,140,797 A | * | 10/2000 | Dunn | 320/105 |
| 6,254,426 B1 | * | 7/2001 | Iacovelli et al. | 439/504 |
| 6,262,492 B1 | * | 7/2001 | Sheng | 307/10.1 |

\* cited by examiner

*Primary Examiner*—Hung V. Ngo
(74) *Attorney, Agent, or Firm*—Rosenberg, Klein & Lee

(57) ABSTRACT

An adaptive booster cable is connected with two pairs of clips, wherein the two pairs of clips are respectively attached to two batteries to transmit power from one battery to the other battery. The adaptive booster cable includes a polarity detecting unit connected to each clip, a switching unit and a current detecting unit both provided between the two pairs of clips. After the polarity of each clip is sensed by the polarity detecting unit, the switching unit generates a proper connection between the two batteries. Therefore, the positive and negative terminals of the two batteries are correctly connected based on the detected result of the polarity detecting unit.

8 Claims, 5 Drawing Sheets

ADAPTIVE BOOSTER CABLE FOR A VEHICLE BATTERY

BACKGROUND OF THE INVENTION

1. Field of Invention

The present invention relates to a booster cable for a vehicle battery, and more particularly to an adaptive booster cable that is capable of detecting the polarities of two interconnected batteries and automatically switching the connection relationship between the two batteries to ensure the batteries are safety connected when jumping a battery.

2. Related Art

Generally, a battery can provide the operating voltage to all electrical devices installed in a vehicle and to start the vehicle engine. Although most vehicles are now equipped with a meter to indicate the charge on the battery, the battery can still be totally discharged due to carelessness of the driver.

A frequent reason for discharging the battery is that the driver forgets to turn off the vehicle lights after turning off the engine. W then the lights are turned on for a long time without running the engine, the lights will continuously drain electricity from the battery. Another reason for a dead battery is that the battery has reached the end of its useful life. As a battery is used, the battery gradually ages and eventually will no longer hold a charge. Notwithstanding the reason for a dead battery, a dead battery represents a serious problem in that the car engine cannot be started with the dead battery. A temporary solution to the problem is to "jump start" the vehicle engine from another, fully charged battery. The two batteries are often electrically connected by a booster cable.

The conventional booster cable is composed of pair of cables. Each cable has two ends, and a clip is attached to each end. The clips on each end of the pair of cables are intended to respectively connect to two poles of a battery. Generally, the clips on one end of the pair of cables are different colors, and the clips on the ends of the same cable are the same color, such as red and black, for polarity recognition. When the booster cable connects two batteries, the positive poles must be connected to each other, and the negative poles must be connected to each other. Failure to recognize the correct polarity by connecting the colored clips to the wrong poles is distinctly possible and can cause catastrophic damage, such as an explosion.

SUMMARY OF THE INVENTION

To overcome the shortcomings, an adaptive booster cable for a vehicle battery in accordance with the present invention obviates or mitigates the aforementioned drawbacks.

The primary objective of the present invention is to provide an adaptive booster cable to automatically detect the polarity relationship of two interconnected batteries and to appropriately switch the connection between the two batteries based on the detected polarity on each clip.

To achieve the objective of the present invention, an adaptive booster cable is connected between two vehicle batteries. Each battery has a positive and a negative pole. The adaptive booster cable comprises a first pair of clips, a second pair of clips, a polarity detecting unit, a switching unit, a current detecting unit and a power supply unit. The two clips in each pair are respectively connected to a positive terminal and a negative terminal on a battery so each clip has a different polarity. The polarity detecting unit connects to each clip to detect the polarity of each clip. The switching unit connects the two pairs of clips. The switching unit appropriately switches the connection between the clips of each pair based on the polarity detected by the polarity detecting unit. The current detecting unit mounted between the two pairs of clips to monitor whether any clip disconnects from the battery. The current detecting unit provides a circuit continuity signal to the polarity detecting unit. The power supply unit provides an operating voltage to the polarity detecting unit.

After the two pairs of clips are respectively connected to the two batteries, the polarity detecting unit detects the polarity of each clip and outputs a control signal to the switching unit generate the correct connection between the two batteries.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
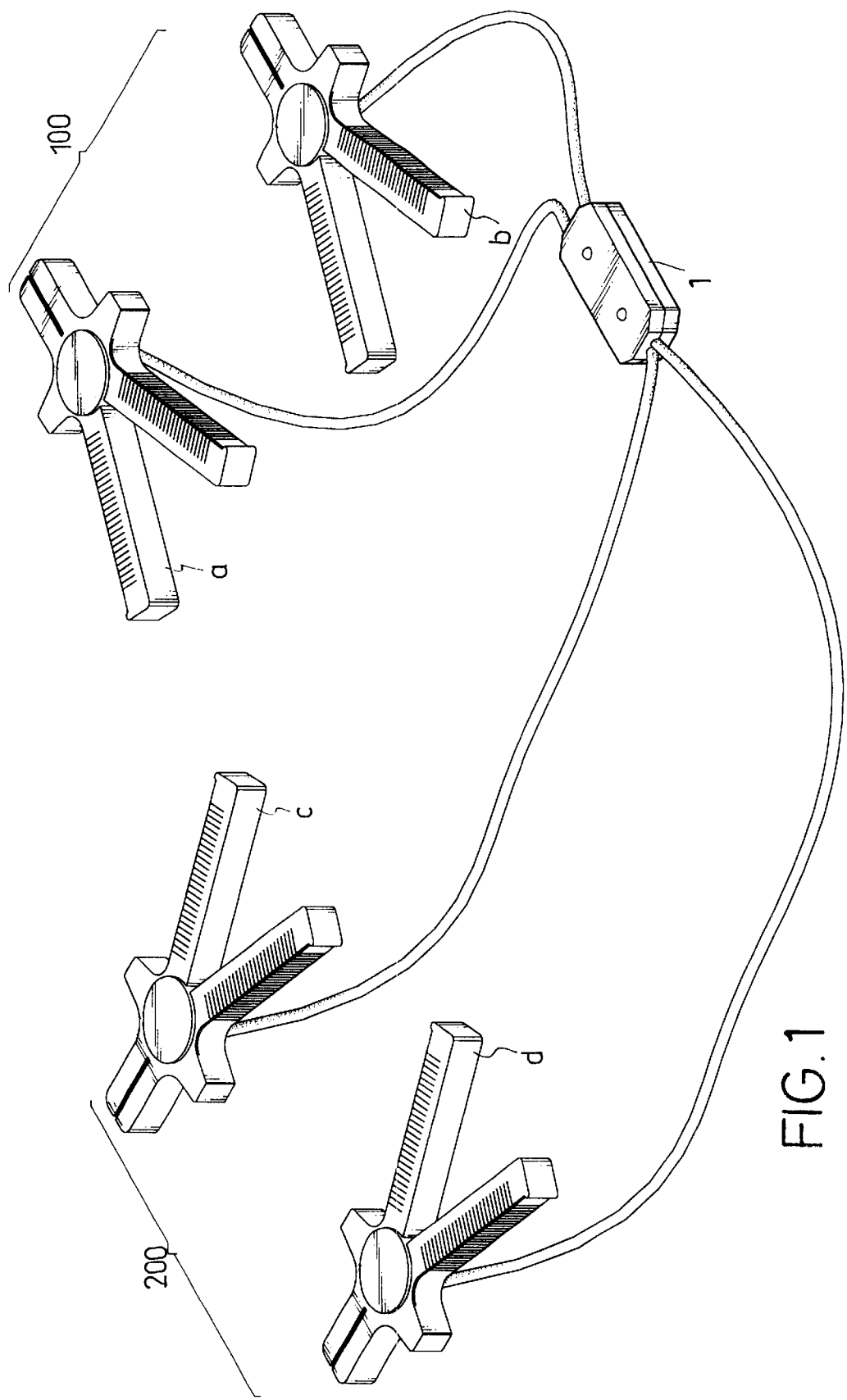
FIG. 1 is a perspective view showing an adaptive booster cable in accordance with the present invention.
Figure 2:
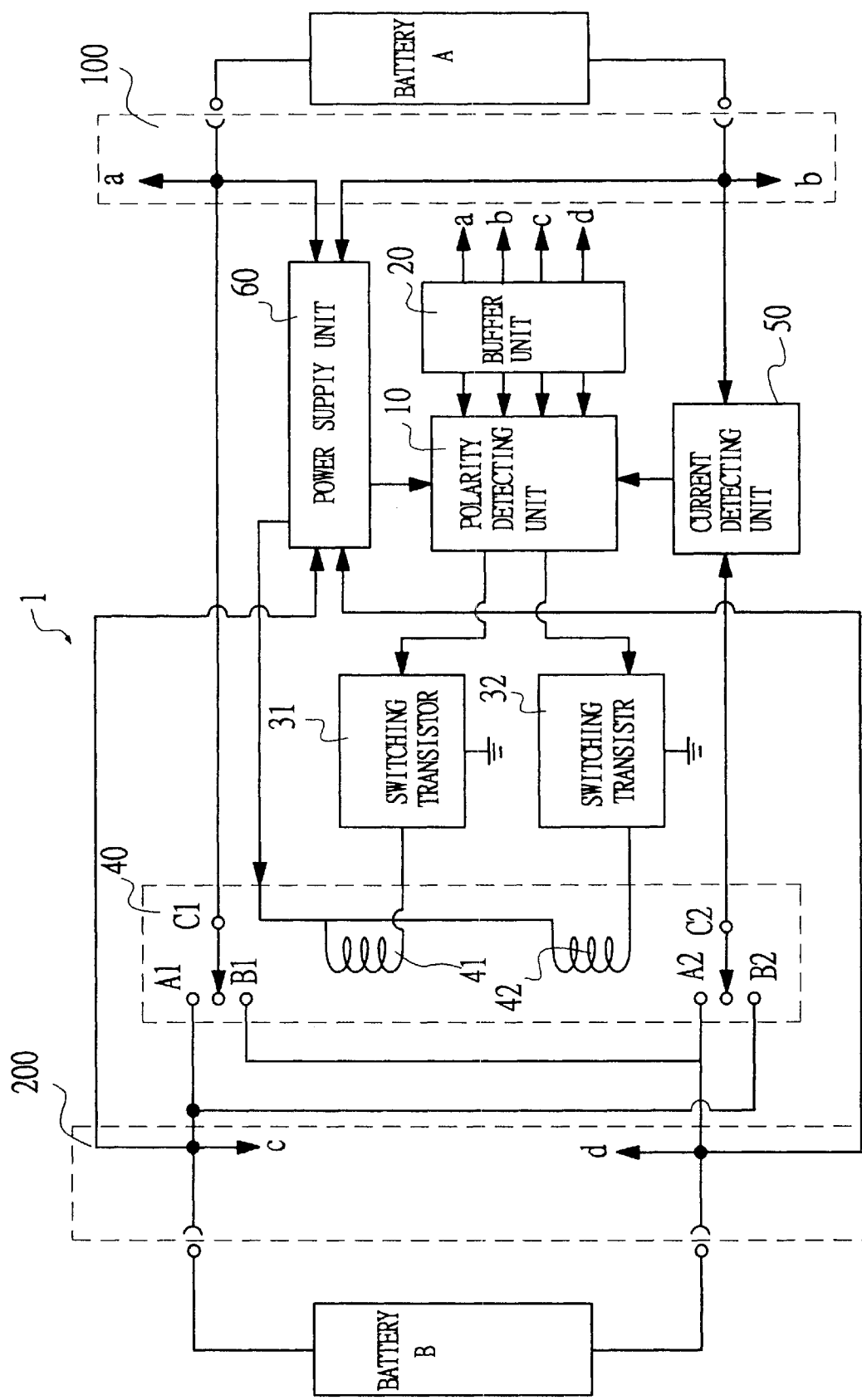
FIG. 2 is a functional circuit diagram of an adaptive booster cable in accordance with the present invention.

With reference to FIGS. 1 and 2, an adaptive booster cable (1) is connected between a first battery (A) and a second battery (B). Each battery (A, B) has a negative pole and a positive pole. The adaptive booster cable (1) comprises two pairs of clips (100, 200), four cables (not numbered), a polarity detecting unit (10), a buffer unit (20), a driving unit (not numbered), a switching unit (40), a current detecting unit (50) and a power supply unit (60).

The first pair of clips (100) is comprised of two clips (a,b) that are respectively connected to opposite poles of the first battery (A). The second pair of clips (200) comprises two clips (c,d) that are respectively connected to opposite poles of the second battery (B). Each cable has a distal end and a proximal end. The clips (a, b, c, d) are respectively connected to the distal ends of the cables.

The polarity detecting unit (10) has four input terminals respectively linked to the four clips (a–d) through the buffer unit (20) that is connected to the proximal end of the four cables. The driving unit is composed of a first switching transistor (31) and a second switching transistor (32), which are respectively connected to two output terminals of the polarity detecting unit (10).

The switching unit (40) is implemented by a relay in this embodiment. The relay has two coils (41, 42) respectively connected to the two switching transistors (31, 32). A first switching terminal (C1) is mounted between a first pair of output terminals (A1, B1) of the relay. Similarly, a second switching terminal (C2) is mounted between a second pair of output terminals (A2, B2). Each coil (41, 42) controls the two switching terminals (C1, C2) of the relay to simultaneously change its connection between two pairs of output terminals (A1-B1, A2-B2). One terminal in each pair is a primary output terminal (A1, A2), and the other terminal in each pair is a secondary output terminal (B1, B2). The two switching terminals (C1, C2) are respectively connected to the two clips (a) and (b) of the first pair of clips (100). the primary output terminals (A1, A2) are respectively connected to the two clips (c, d) of the second pair of clips (200). the secondary output terminals (B1, B2) are respectively cross-connected to the primary output terminal (A2, A1) of the opposite pair of output terminals.

The current detecting unit (50) is coupled between the first pair of-clips (100) and the second paired clips (200) through the switching unit (40) to check whether any clip (a)–(d) is detached from either the first or second battery (A, B). The current detecting unit (50) further outputs a circuit continuity signal to the polarity detecting unit (10) based on the sensed current status.

The power supply unit (60) is connected with the two pairs of clips (100, 200), the polarity detecting unit (10) and the two coils (41, 42). After the first pair of clips (100) or the second pair of clips (200) is attached to the corresponding battery (A, B), the power supply unit (60) immediately provides an operating voltage to activate the polarity detecting unit (10). Simultaneously, a current from the power supply unit (60) passes through one of the two coils (41, 42) based on the on/off status of the two switching transistors (31, 32).

With reference to the following table, table 1 shows that the on/off status of the two switching transistors (31, 32) is determined by the polarity of each attached clip (a)–(d).

TABLE 1

| clip (a) | clip (b) | clip (c) | clip (d) | first transistor (31) | second transistor (32) |
|---|---|---|---|---|---|
| + | − | + | − | ON | OFF |
| − | + | − | + | ON | OFF |
| + | − | − | + | OFF | ON |
| − | + | + | − | OFF | ON |

Firstly, when one of the two pairs of clips (100, 200), for example the clips (a, b) in the first pair of clips (100), is attached to two poles of the corresponding battery (A, B), in this example the first battery (A), the power supply unit (60) immediately outputs the operating voltage to activate the polarity detecting unit (10). The two switching transistors (31, 32) are still kept OFF. Therefore, the two switching terminals (C1, C2) of the relay will remain in the middle position and do not contact either the primary output terminals (A1, A2) or the secondary output terminals (B1, B2).

After the clips (c, d) of the second pair of clips (200) are attached to the poles of the second battery (B), the polarity detecting unit (10) starts to detect the polarity of each clip (a–c) and outputs a control signal to drive one switching transistor (31, 32) based on the relationship shown in Table 1.

The relationships between the switching transistors (31, 32) and the polarity of each clip (a)–(d) shown in Table 1 can be briefly separated into two types, Type I and Type II.

Type I: The polarities of the clips (a) and (b) in the first pair of clips (100) are respectively identical with the clips (c) and (d) in the second pair of clips (200).

Figure 3:
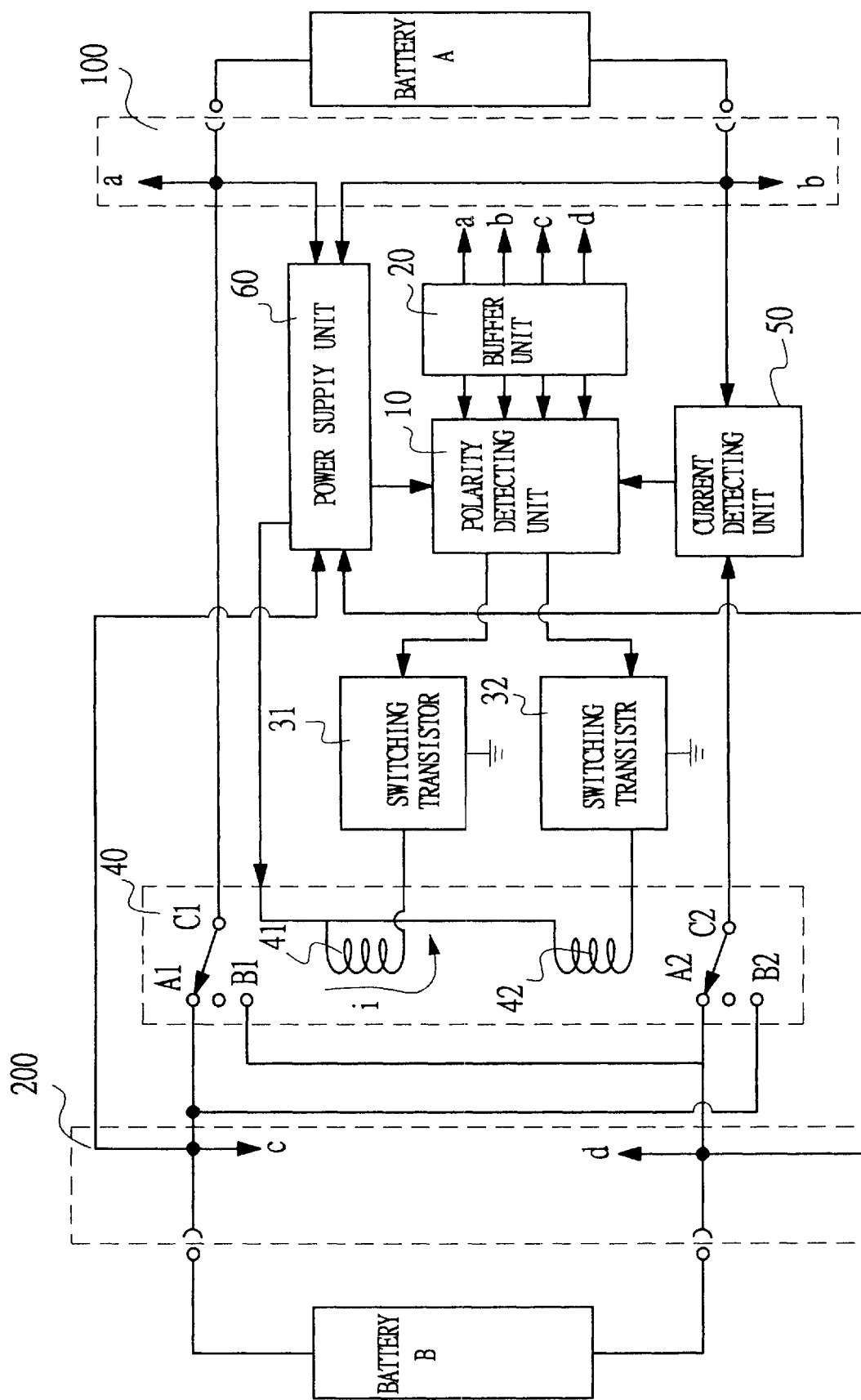
FIG. 3 is a first operational functional circuit diagram of the adaptive booster cable of FIG. 1 when the polarity of clip (a) is the same as clip (c) [Type I]

With reference to FIG. 3 and table 1, when the polarity detecting unit (10) detects that a Type I condition exists, only the first switching transistor (31) is activated. Therefore, the current (i) from power supply unit (60) flows through the first coil (41). When the first coil (41) is energized by the current and generates a magnetic-induction force, the two switching terminals (C1, C2) are simultaneously switched to contact the primary output terminals (A1, A2). Thereby, the clips (a, b) in the first pair of clips (100) are respectively and correctly connected to the clips (c, d) in the second pair of clips (200) to proceed with the transmission power between the batteries (A, B), i.e. the boosting process.

Type II: The polarities of the clips (a, b) in the first pair of clips (100) are not respectively identical with the polarities of the clips (c, d) in the second pair of clips (200).

Figure 4:
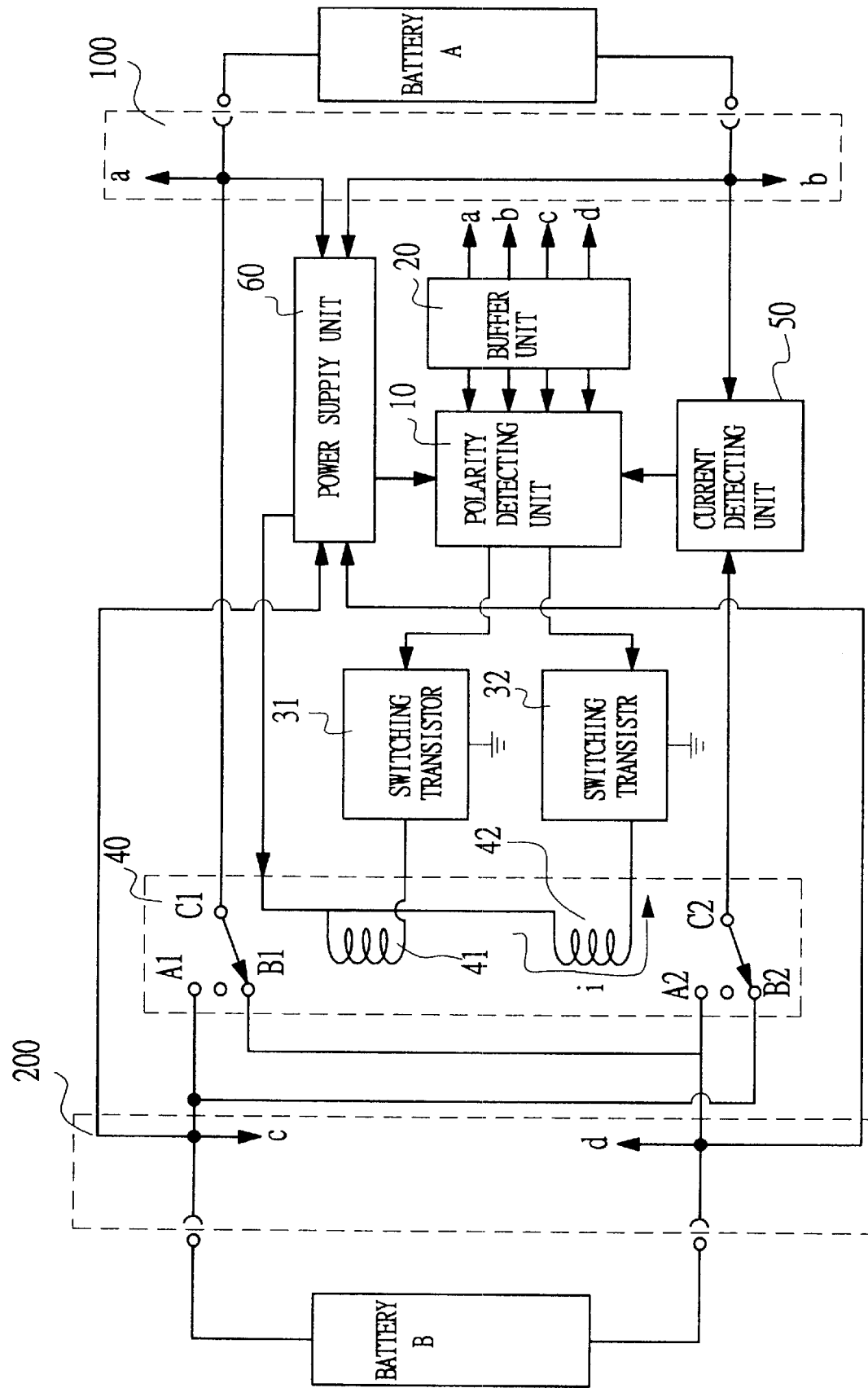
FIG. 4 is a second operational functional circuit diagram of the adaptive booster cable of FIG. 1 when the polarity of clip (a) is the same as clip (d) [Type II]
Figure 5:
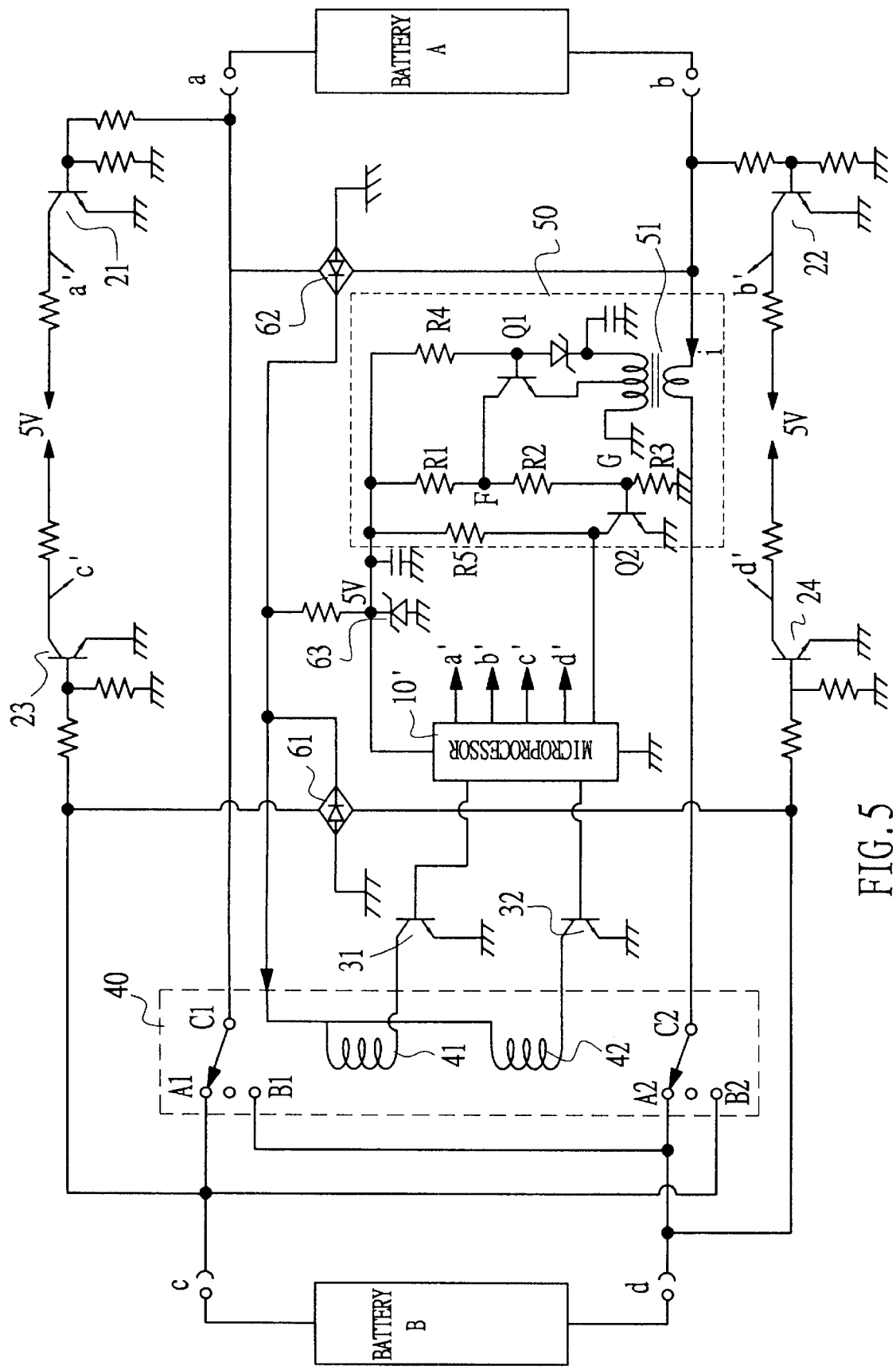
FIG. 5 is a detailed circuit diagram of the adaptive booster cable of FIG. 1.

With reference to FIG. 4 and Table 1, when the polarity detecting unit (10) detects that the polarity of clip (a) is not the same as clip (c), (as shown in rows 4 and 5 in table 1), only the second switching transistor (32) is activated. Therefore, the current (i) from the power supply unit (60) flows through the second coil (42). Similarly, after the second coil (42) is energized by the current and generates a magnetic-induction force, the two switching terminals (C1, C2) are simultaneously switched to contact the secondary output terminals (B1, B2). However, since the secondary output terminals (B1, B2) are cross-connected to the primary output terminals (A2, A1), the clips (a, b) of the first pair of clips (100) are still respectively and correctly connected to the clips (d, c) of the second pair of clips (200).

During power transmission in either a Type I or Type II configuration, the current detecting unit (50) monitors the power transmission circuit to determine if any clip (a, b, c, d) has disconnected from the battery. If any clip disconnects from the battery, the battery charging path between the two batteries is immediately interrupted. Thereafter, the current detecting unit (50) outputs a circuit continuity signal to the polarity detecting unit (10) to de-activate the switching transistors (31, 32). Since the two switching transistors (31, 32) are not conducting, no current passes through the first coil (41) or second coil (42) so the two switching terminals (C1, C2) are switched back to the middle position.

The polarity detecting unit (10) is implemented with a microprocessor (10'). The relationship shown in Table 1 is implemented by means of a computer program stored in the microprocessor (10'). When the microprocessor (10') detects the polarity of each clip, the microprocessor (10') determines which switching transistor (31, 32) is activated based on the computer program. Further, the buffer unit (20) is composed of four transistors (21–24).

The power supply unit (60) is mainly composed of two bridge rectifiers (61, 62) and a Zener diode (63). The bridge rectifiers (61, 62) are respectively coupled to the first and second batteries (A, B), and the Zener diode (63) has a negative terminal connected to the output terminals of the two bridge rectifiers (61, 62) used as a constant voltage source, 5 volts in this embodiment. The constant voltage, 5 volts, is supplied to the microprocessor (10') as the operating voltage. The current detecting unit (50) is composed of a blocking oscillator in this embodiment. The blocking oscillator is constituted by an oscillation transformer (51) with a primary winding and a secondary winding, resistors (R1–R5) and transistors (Q1, Q2) each with an emitter, a collector and a base. The primary winding is connected between the second clip (b) of the first pair of clips (100) and the switching terminal (C2). A central tap of the secondary winding is connected to the emitter of transistor Q1, wherein the base of transistor Q1 is connected to the Zener diode (63) through resistor R4.

The three resistors (R1–R3) sequentially connected in series constitute a voltage divider circuit between the negative terminal of the Zener diode (63) and ground. A node "F" between the first two resistors (R1, R2) is further linked to the collector of transistors Q1.

The base of transistor Q2 is connected to a node "G" between the second two resistors (R2, R3). The collector of transistor Q2 is connected to the microprocessor (10') and the negative terminal of the Zener diode (63) through resistor R5.

When there is no power transmission between the two batteries A and B, the primary winding of the oscillation transformer (51) has no current pass through (i.e. i=0). The blocking oscillator is kept in oscillation and transistor Q1 is activated. A current from the Zener diode (63) flows through resistor R1 and transistor Q1 to ground, where the voltage level at node "F" is low and transistor Q2 is not activated. Since transistor Q2 is not activated, and the collector is connected to the microprocessor (10') and the Zener diode (63), the microprocessor (10') receives a high voltage level signal from the collector.

On the other hand, when a current flows through the primary winding as power is transmitted between the two batteries (A, B), the core of the oscillation transformer is saturated and stops the oscillation. When the oscillation is stopped, the voltage level at node "F" raises to a high level and transistor Q2 is activated. Since transistor Q2 is activated, the microprocessor (10') receives a low voltage level signal from the collector. Thereby, based on the voltage level from the collector of transistor Q2, the microprocessor (10') is able to determine whether the power transmission path between two batteries (A, B) has been interrupted or not.

The adaptive booster cable in accordance with the present invention is able to automatically detect the polarities of two interconnected batteries and generate correct circuit paths between the batteries. Therefore, a person does not need to determine the polarities of two batteries before a battery is boosted. Furthermore, since the two batteries are automatically and correctly interconnected, any possible injury to a user caused from improper connection of the polarities are avoided and eliminated.

The invention may be varied in many ways by a skilled person in the art. Such variations are not to be regarded as a departure from the spirit and scope of the invention, and all such modifications are intended to be included within the scope of the following claims.

What is claimed is:

1. An adaptive booster cable (1) to connect two vehicle batteries, each battery having a positive and a negative pole, the adaptive booster cable (1) comprising:
   a first pair of clips (a, b) to connect to the positive and negative poles of a first battery such that each clip (a, b) has a different polarity;
   a second pair of clips (c, d) to connect to the positive and negative poles of a second battery such that each clip (c, d) has a different polarity;
   a polarity detecting unit (10) connected to each clip (a–d) to detect the polarity of each clip (a–d);
   a switching unit (40) connecting the first pair of clips (a, b) and the second pair of clips (c, d), wherein the switching unit (40) is further connected to the polarity detecting unit (10) through a driving unit and generates a correct connection between the first pair of clips (a, b) and the second pair of clips (c, d) based on the polarity detected by the polarity detecting unit (10); and
   a current detecting unit (50) provided between the first pair of clips (a, b) and the second pair of clips (c, d) to sense any clip detached from the battery, wherein the current detecting unit (50) provides a circuit continuity signal to the polarity detecting unit (10).

2. The adaptive booster cable (1) as claimed in claim 1 further comprising a power supply unit (60) to provide an operating voltage to the polarity detecting unit (10).

3. The adaptive booster cable (1) as claimed in claim 2, wherein the power supply unit is composed of a first bridge rectifier (61), a second bridge rectifier (62) and a Zener diode (63), wherein the first and second bridge rectifiers (61, 62) are respectively for connection to the first pair of clips (a, b) and the second pair of clips (c, d), wherein the Zener diode (63) with a negative terminal connects to output terminals of the first and the second bridge rectifier (61, 62).

4. The adaptive booster cable (1) as claimed in claim 1, wherein the switching unit (40) is a relay, the relay comprising:
   a first switching terminal (C1) and a second switching terminal (C2) respectively connected to the first pair of clips (a, b);
   a first pair of output terminals (A1, B1) composed of a first primary output terminal (A1) and a first secondary output terminal (B1) selectively connected to the first switching terminal (C1);
   a second pair of output terminals (A2, B2) composed of a second primary terminal (A2) and a second secondary terminal (B2) selectively connected to the second switching terminal (C2), wherein the first primary output terminal (A1) and the second primary terminal (A2) are respectively for connection to the second paired clips (c, d), wherein the first secondary output terminal (B1) is further linked to the second primary output terminal (A2) and the second secondary output terminal (B2) is further linked to the first primary output terminal (A1); and
   a first coil (41) and a second coil (42) selectively energized by the driving unit respectively control the first switching terminal (C1) and the second switching terminal (C2).

5. The adaptive booster cable (1) as claimed in claim 4, wherein the driving unit is composed of a first switching transistor (31) and a second switching transistor (32) respectively to determine whether the first coil (41) and the second coil (42) are energized or not.

6. The adaptive booster cable (1) as claimed in claim 1, wherein the polarity detecting unit (10) is a microprocessor (10') with an input terminal (s) for connection to each clip (a–d) through a buffer unit (20), wherein a computer program in the microprocessor (10') controls the switching unit (20) to generate the correct connection.

7. The adaptive booster cable (1) as claimed in claim 1, wherein the current detecting unit (50) is a blocking oscillator, wherein the oscillation of the blocking oscillator is in response to a current between the first and the second batteries.

8. The adaptive booster cable (1) as claimed in claim 7, wherein the blocking oscillator comprises:

an oscillation transformer (51) with a primary winding and a secondary winding, wherein the primary winding is coupled between the first pair of clips (a, b) and the second pair of clips (c, d), where the secondary winding has a central tap that connects to an emitter of a first transistor (Q1), wherein a base of the first transistor (Q1) is connected to the power supply unit (60);

a voltage dividing circuit composed of three resistors (R1, R2, R3) connected in series between the power supply unit (60) and ground, wherein a first node (F) between the first and second resistors (R1, R2) is linked to a collector of the first transistor (Q1);

a second transistor (Q2) with a base connected to a second node (G) between the second and third resistors (R2, R3) in the voltage dividing circuit, wherein a collector of the second transistor (Q2) is connected to the power supply unit (60) and the polarity detecting unit (10).

\* \* \* \* \*